United States Patent [19]

Seitz

[11] Patent Number: 5,644,990

[45] Date of Patent: Jul. 8, 1997

[54] RAILROAD CAR HATCH COVER

[75] Inventor: Robert F. Seitz, Batavia, Ill.

[73] Assignee: Dev-Mark, Inc., North Aurora, Ill.

[21] Appl. No.: 613,489

[22] Filed: Mar. 11, 1996

[51] Int. Cl.[6] ............................................. B61D 39/00
[52] U.S. Cl. ........................ 105/377.07; 105/377.08; 220/213
[58] Field of Search ................... 105/377.01, 377.05, 105/377.07, 377.08; 114/210 R; 220/213

[56] References Cited

U.S. PATENT DOCUMENTS

| | | | |
|---|---|---|---|
| 2,970,347 | 2/1961 | Massopust | 105/377.07 |
| 3,228,353 | 1/1966 | Carney | 105/377.07 |
| 4,297,757 | 11/1981 | Palemon Camu | 114/201 R |
| 4,346,664 | 8/1982 | Enzian | 114/201 R |
| 4,819,830 | 4/1989 | Schultz | 105/377.07 |
| 5,158,022 | 10/1992 | Dugge et al. | 105/377.07 |
| 5,517,925 | 5/1996 | Early | 105/377.07 |

*Primary Examiner*—Mark T. Le
*Attorney, Agent, or Firm*—Dorn, McEachran, Jambor & Keating

[57] ABSTRACT

A railroad car hatch cover assembly includes a ring which defines a car body opening. There is a peripheral seal attached to the ring. A hatch cover is hinged to the ring and closes upon the ring and seal to close the car body opening. There is a lock assembly generally diametrically opposite the hinge for securing the hatch cover in a closing position. The hatch cover has a peripheral sloping side wall and an integral top. The side wall has a bottom surface. The angle between the sloping peripheral side wall and the side wall bottom surface is constant over the interior periphery of the cover. The height of the sloping side wall gradually increases from a minimum height adjacent the hinge and lock assembly to a maximum height generally midway between the hinge and lock assembly.

4 Claims, 3 Drawing Sheets

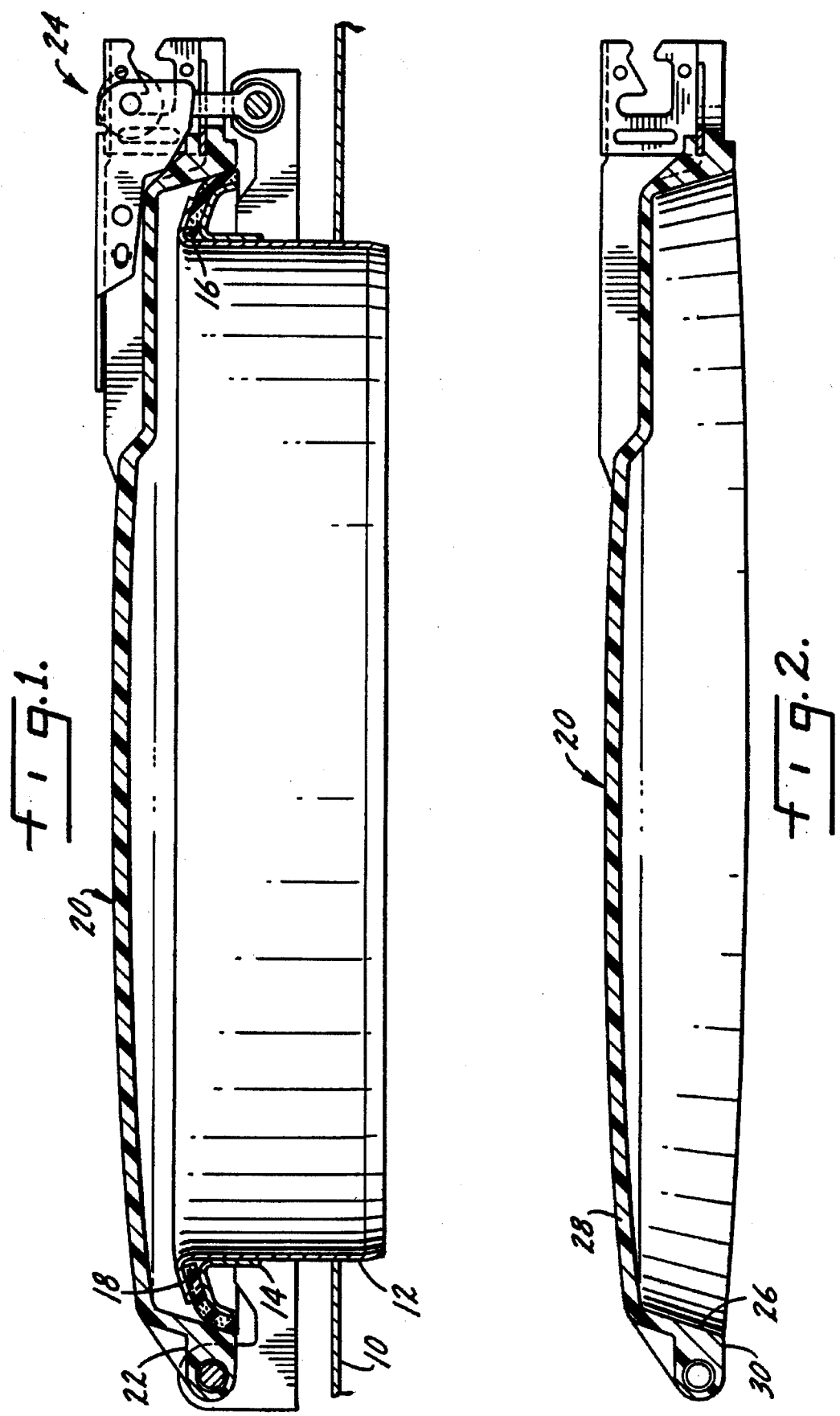

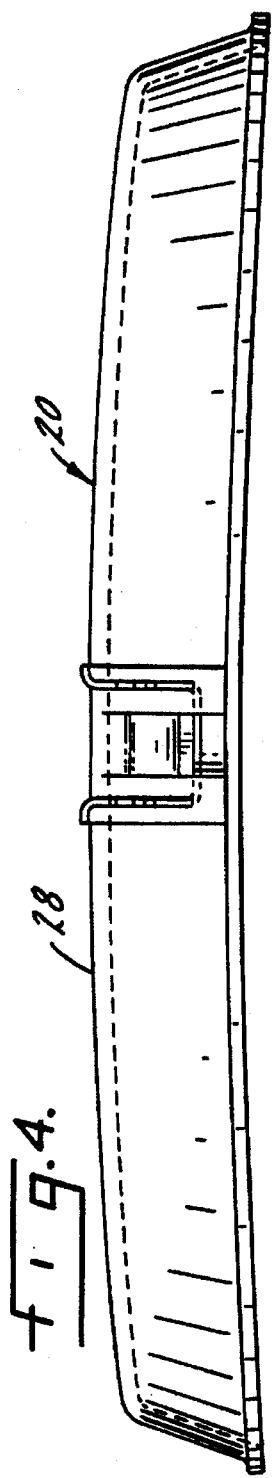
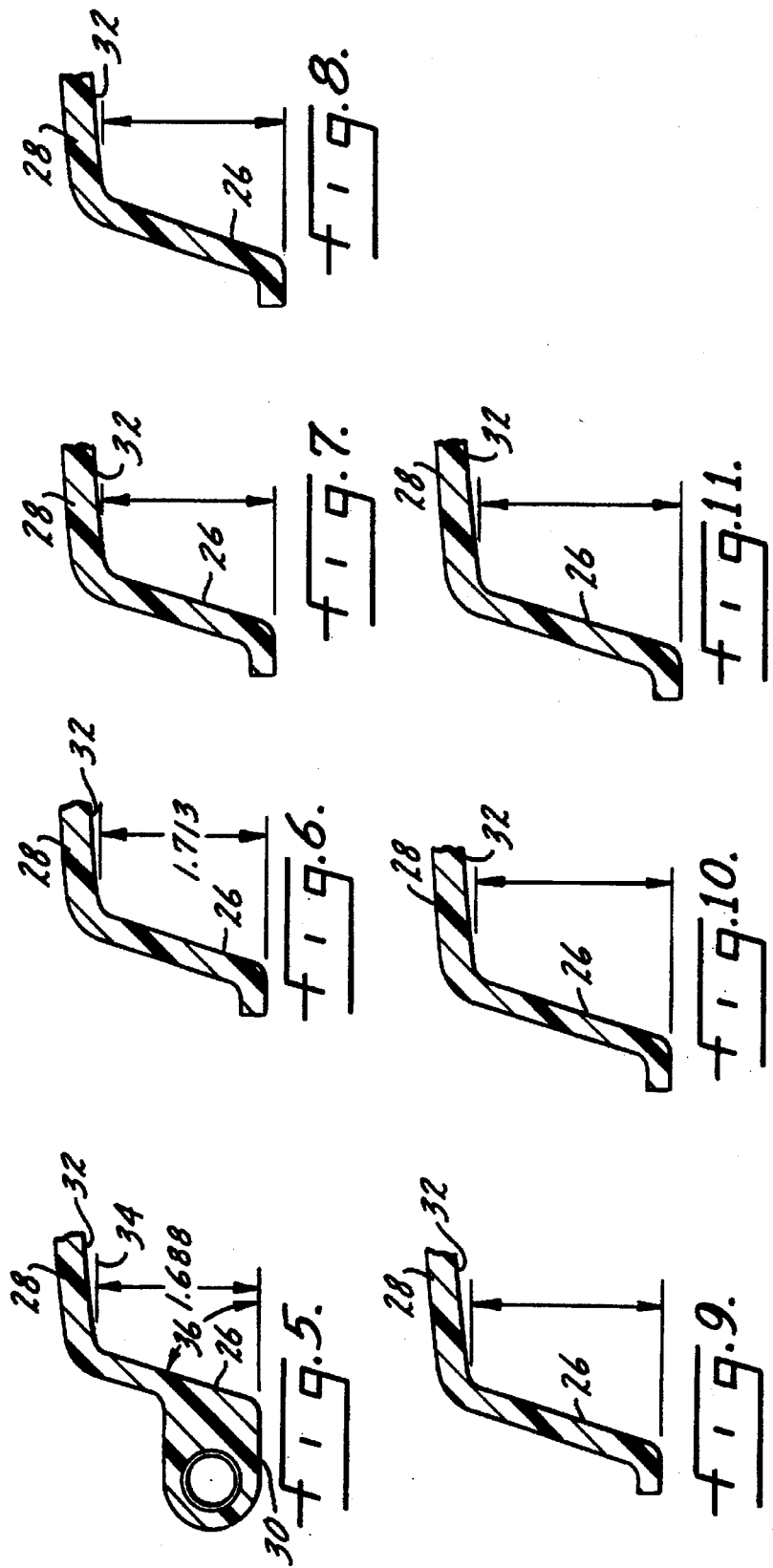

RAILROAD CAR HATCH COVER

THE FIELD OF THE INVENTION

The present invention relates to hatch covers for railroad cars and particularly to a hatch cover useful with a covered hopper car. The hatch cover is pivotally mounted to a ring which defines the car body opening and there is a lock assembly generally diametrically opposite the hinge connection for locking the hatch cover in a closed position.

Conventionally, in the manufacture of covered hopper cars, the upper half of the car body is placed in a fixture and the ring defining the hatch cover opening is welded in the areas of the hinge and the lock assembly to lugs which locate the ring and support it for welding purposes. The upper part of the car body is then removed from the fixture and welded and assembled to the remaining structure of the car body. After this has taken place the ring defining the car body opening is peripherally welded to the access cover opening. For reasons not currently known it has been determined that when the ring weld is completed at the access cover opening, it tends to become cambered relative to the car roof. The camber is most pronounced generally midway between the lugs which support the ring at the hinge and lock assembly. Thus, the ring tends to dip or have a decreased wall height generally midway between the hinge and the lock assembly.

The present invention relates to the hatch cover which closes upon the ring and seal and particularly to a plastic hatch cover. In order to compensate for the camber of the ring as described above, the hatch cover peripheral sloping side wall gradually increases from a minimum height adjacent the hinge and lock assembly to a maximum height generally midway between the hinge and lock assembly. Although the height of the side wall increases, the angle between the sloping peripheral side wall and the side wall bottom surface remains constant. This results in the radial distance of the peripheral intersection of the sloping peripheral side wall and the integral cover gradually decreasing from a maximum adjacent to the hinge and lock assembly to a minimum generally between the hinge and lock assembly.

SUMMARY OF THE INVENTION

The present invention relates to hatch cover assemblies for covered hopper cars and particularly to a plastic hatch cover which compensates for camber resulting from welding of the access opening ring to the car body roof. A primary purpose of the invention is a hatch cover assembly as described in which the hatch cover peripheral side wall gradually increases from a minimum height adjacent the hinge and lock assembly to a maximum height generally midway between the hinge and lock assembly.

Another purpose is a hatch cover as described in which the angle between the sloping peripheral side wall and the side wall bottom surface is constant over the interior periphery of the cover.

Another purpose of the invention is to provide a plastic hatch cover assembly as described wherein the radial distance from the top of the sloping wall to the center of the integral top gradually decreases from a maximum at the hinge and lock assembly to a minimum generally midway between the hinge and lock assembly.

Another purpose of the invention is a hatch cover as described wherein the peripheral intersection of the sloping peripheral side wall and the integral cover is a constant distance from a plane defined by the side wall bottom surface at the hinge and lock assembly.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, showing the hatch cover mounted on the car body;

FIG. 2 is a side view, in part section, of the hatch cover;

FIG. 4 is a side view of the hatch cover illustrating the lock assembly bracket;

FIG. 5 is a section along plane 5—5 of FIG. 3;

FIG. 6 is a section along plane 6—6 of FIG. 3;

FIG. 7 is a section along plane 7—7 of FIG. 3;

FIG. 8 is a section along plane 8—8 of FIG. 3;

FIG. 9 is a section along plane 9—9 of FIG. 3;

FIG. 10 is a section along plane 10—10 of FIG. 3; and

FIG. 11 is a section along plane 11—11 of FIG. 3.

DESCRIPTION OF THE PREFERRED EMBODIMENT

Figure 3:
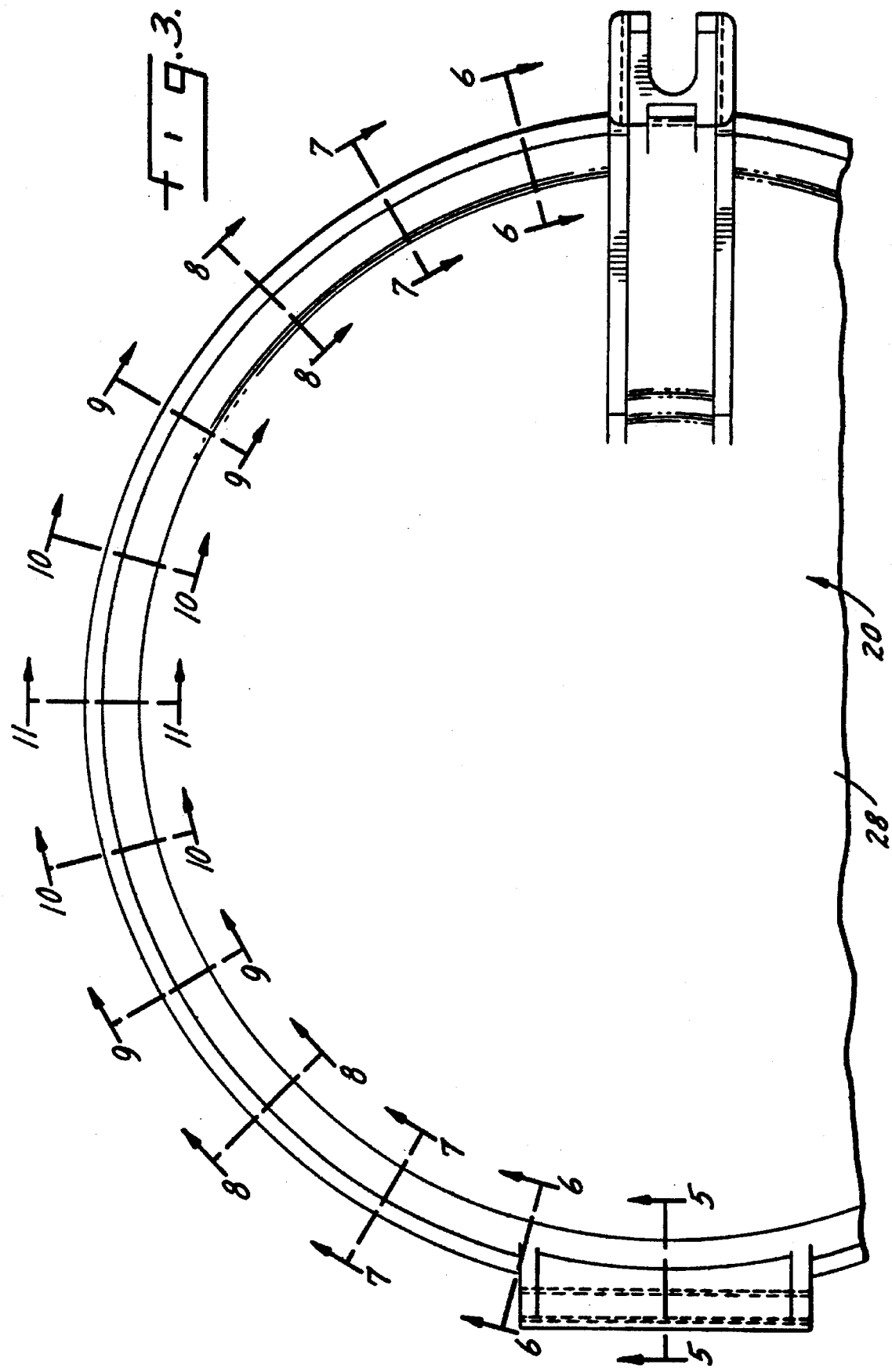
FIG. 3 is a partial top view of the hatch cover.

In the drawings, the car body top or roof is indicated at 10 and there is an access opening therein in which is positioned a ring 12. Conventionally, the ring is welded to the car body top. Welded to the periphery of the ring 12 is a gasket retainer 14 upon which is mounted a sealing gasket 16. The ring has an outwardly directed, slightly downturned flange 18 which overlies the exterior or top side of the gasket 16, with the gasket being sandwiched between the flange 18 and the gasket retainer 14.

The hatch cover is indicated at 20 and has a hinge assembly 22 secured to one side thereof. A lock assembly 24 is mounted on the opposite side of the ring 12, generally diametrically opposite the hinge assembly 22. Details of the hinge and the lock assembly are illustrated in U.S. Pat. No. 5,438,935 owned by Dev-Mark, Inc., assignee of the present application. The disclosure of the '935 patent is herein incorporated by reference.

When the ring 12 is welded to the roof of the car body 10, it is initially welded to lugs located at the hinge 22 and the lock assembly 24. The roof is then welded to the understructure of the car body. The welding of the ring 12 to the lugs adjacent the underside of the roof 10 is primarily for location purposes prior to full assembly of the car body. Once the car body has been assembled, the ring 12 is peripherally welded to the roof 10. For reasons not currently known, when the ring 12 is so welded, it tends to camber or dip in the area midway between the hinge assembly 22 and the lock assembly 24. As an example, but without limitation, the camber can be as much as a quarter of an inch midway between the hinge and lock assemblies 22 and 24 in a ring having a 20" inside diameter. The present invention provides a unique construction of the hatch cover 20 in order to compensate for the described camber.

FIGS. 5–11 are partial sections taken along successive planes in FIG. 3 illustrating the specific construction of the hatch cover to compensate for the described camber.

The hatch cover has an interior sloping peripheral wall 26 and an integral top 28. The dimensions set forth in FIGS. 5–11 are purely for purposes of illustration and the invention should not be limited to a hatch cover of this particular size. The section of FIG. 5 is taken at the location of hinge 22 and also represents the construction of the hatch cover at the lock assembly 24. Note the distance of 1.688 inches from the bottom surface 30 of the sloping side wall 26 to the intersection of the sloping side wall 26 and the lower surface 32 of the integral cover 28. The angle between sloping wall 26 and the plane which intersects the bottom surface 30, and is parallel to plane 34 which represents the intersection of surfaces 26 and 32, is 17° 30'. This angle remains constant in the sections of FIGS. 5–11. The distance however from the plane 34 to the bottom surface 30 increases. Note that in the section of FIG. 6 there has been an increase of 0.025", with successive and gradual increases being shown in the remaining views of FIGS. 7–11. The maximum height of the sloping side wall 26 is illustrated in FIG. 11 which is a section at the midpoint between the hinge and the lock assembly. The height of the sloping side wall 26 gradually increases from the hinge to the midpoint and then it gradually decreases from the midpoint to the lock assembly. The same is true for both sides of the periphery of the hatch cover as it is symmetrical.

The height of the sloping side wall 26 gradually increases as described; the included angle 36 between the sloping side wall 26 and the plane which intersects the bottom surface 30 and is parallel to plane 34 remains constant and the radial distance from the hatch cover center to the intersection of surface 26 and cover lower surface 32 gradually decreases. This is brought about because if the side wall increases in length and the angle remains constant, the distance from the point of intersection to the center of the hatch cover must decrease. This is illustrated in the dimensions shown in FIGS. 5–11.

Preferably the hatch cover is made of plastic and as such it has some flexibility. To achieve an adequate seal between the interior surface 26 of the cover 20 and the sealing gasket 16 it is necessary to compensate for the camber of the ring 12. The gradual change in the height of sloping surface 26 with the consequent changes in the other dimensions as described provides the desired result. The cover is designed with a gradual increase in depth of the side wall on both sides away from the hinge and the lock assembly. This allows the cover to contact the sealing gasket at the sides either prior to contact at the hinge and lock ends, or at least at approximately the same time. When contact is made depends on how much camber is produced when the ring 12 is welded to the car roof 10. If there is as much camber in the car ring as extra depth on the sides of the cover, then contact will be approximately at the same time on the total circumference of the cover. If there is less camber in the car ring, the cover sides will contact first, assuring an adequate seal at the sides. The cover is designed with sufficient flexibility to allow the sides to flex if they contact the sealing gasket prior to contact at the area of the hinge and lock assembly, thereby allowing the hinge and lock ends to seal adequately. The change in depth or height of the sloping side wall is gradual, thereby allowing uniform gradual deflection of the cover as needed to make sure the gasket 16 is in total circumferential contact with the interior sloping surface 26 of the side wall.

Whereas the preferred form of the invention has been shown and described herein, it should be realized that there may be many modifications, substitutions and alterations thereto.

The embodiments of the invention in which an exclusive property or privilege is claimed are defined as follows:

1. A railroad car hatch cover assembly including a ring defining a car body opening, a peripheral seal attached to said ring, a hatch cover for closing upon said ring and seal to close the car body opening, a hinge adjacent said ring for pivotally mounting said hatch cover and a lock assembly generally diametrically opposite said hinge for securing said hatch cover in a closing position upon said ring and seal, said hatch cover having a peripheral sloping side wall and an integral top, said side wall having a bottom surface, the angle between the sloping peripheral side wall and a plane which is an extension of the side wall bottom surface and is parallel to a plane which represents the intersection of the side wall and the integral top being constant over the interior periphery of said cover, the height of the sloping side wall gradually increasing from a minimum height adjacent the hinge and locking assembly to a maximum height generally midway between the hinge and lock assembly.

2. The hatch cover assembly of claim 1 wherein the radial distance from the top of said sloping wall to the center of said integral top gradually decreases from a maximum radial distance adjacent the hinge and lock assembly to a minimum radial distance generally midway between the hinge and lock assembly.

3. The hinge cover assembly of claim 1 wherein the peripheral intersection of the sloping peripheral side wall and the integral top is a constant distance from a plane defined by the side wall bottom surface at the hinge and lock assembly.

4. The hatch cover assembly of claim 1 wherein said cover is formed of a plastic material.

* * * * *